US012526590B2

(12) United States Patent
Sylopp et al.

(10) Patent No.: US 12,526,590 B2
(45) Date of Patent: Jan. 13, 2026

(54) APPARATUS AND METHOD FOR DETERMINING AUDIO PROCESSING PARAMETERS

(71) Applicant: Fraunhofer-Gesellschaft zur Förderung der angewandten Forschung e.V., Munich (DE)

(72) Inventors: Peggy Sylopp, Oldenburg (DE); Tobias Bruns, Oldenburg (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 241 days.

(21) Appl. No.: 18/513,012

(22) Filed: Nov. 17, 2023

(65) Prior Publication Data

US 2024/0089672 A1 Mar. 14, 2024

Related U.S. Application Data

(63) Continuation of application No. PCT/EP2022/063211, filed on May 16, 2022.

(30) Foreign Application Priority Data

May 17, 2021 (DE) ......................... 102021204974.5

(51) Int. Cl.
*H04R 25/00* (2006.01)

(52) U.S. Cl.
CPC .................................. *H04R 25/507* (2013.01)

(58) Field of Classification Search
CPC ............ H04R 2225/39; H04R 2225/41; H04R 2225/55
See application file for complete search history.

(56) References Cited

U.S. PATENT DOCUMENTS

| | | | | |
|---|---|---|---|---|
| 6,035,050 A * | 3/2000 | Weinfurtner | H04R 25/507 | 381/313 |
| 7,738,667 B2 * | 6/2010 | Bramslow | H04R 25/70 | 381/317 |
| 7,826,631 B2 * | 11/2010 | Fischer | H04R 25/70 | 381/317 |
| 8,411,888 B2 * | 4/2013 | Nielsen | H04R 25/70 | 381/317 |
| 9,883,297 B2 * | 1/2018 | Ungstrup | H04W 4/80 | |
| 11,310,608 B2 * | 4/2022 | Schoen | G06F 18/41 | |
| 11,337,011 B2 * | 5/2022 | Goorevich | H04R 25/50 | |
| 11,601,765 B2 * | 3/2023 | Aubreville | H04R 25/507 | |

(Continued)

FOREIGN PATENT DOCUMENTS

| | | |
|---|---|---|
| DE | 10347211 A1 | 5/2005 |
| DE | 102019203786 A1 | 2/2020 |

(Continued)

OTHER PUBLICATIONS

Office Action dated Feb. 21, 2025 in the parallel Japanese patent application No. 2023-571527 (11 pages).

(Continued)

*Primary Examiner* — Ryan Robinson
(74) *Attorney, Agent, or Firm* — Haynes and Boone, LLP

(57) ABSTRACT

The present invention relates to an apparatus and a method for determining audio processing parameters in dependence on at least one audio input signal.

22 Claims, 6 Drawing Sheets

(56) References Cited

U.S. PATENT DOCUMENTS

| | | | | |
|---|---|---|---|---|
| 2004/0190739 | A1* | 9/2004 | Bachler | H04R 25/305<br>381/314 |
| 2006/0222194 | A1 | 10/2006 | Bramslow et al. | |
| 2015/0195641 | A1 | 7/2015 | Di Censo et al. | |
| 2016/0044163 | A1 | 2/2016 | Jiang | |
| 2018/0063653 | A1* | 3/2018 | Aschoff | H04R 25/558 |
| 2019/0149929 | A1 | 5/2019 | Fitz et al. | |
| 2020/0066264 | A1 | 2/2020 | Kwatra et al. | |
| 2020/0220511 | A1 | 7/2020 | Shaya et al. | |
| 2024/0321281 | A1* | 9/2024 | Laroche | G10L 19/08 |

FOREIGN PATENT DOCUMENTS

| | | | |
|---|---|---|---|
| DE | 102019200956 | A1 | 7/2020 |
| DE | 102019216100 | A1 | 4/2021 |
| EP | 0814636 | A1 | 12/1997 |
| JP | H08249303 | A | 9/1996 |
| JP | 2015130659 | A | 7/2015 |
| JP | 2021525493 | A | 9/2021 |
| WO | 2019233358 | A | 12/2019 |

OTHER PUBLICATIONS

Website: https://urlisolation.com/browser?clickId=2C80242C-5A72-4BEA-B4CE-61BBAC78FF7A&traceToken=1705425340%3Bhaynesboone_hosted%3Bhttps%3A%2Fgithub.com%2Fliketchear%2Flik&url=https%3A%2F%2Fgithub.com%2Fliketchear%2Fliketohear-ai-pt (screenshot attached).

* cited by examiner

APPARATUS AND METHOD FOR DETERMINING AUDIO PROCESSING PARAMETERS

CROSS-REFERENCE TO RELATED APPLICATIONS

This application is a continuation of copending International Application No. PCT/EP2022/063211, filed May 16, 2022, which is incorporated herein by reference in its entirety, and additionally claims priority from German Application No. 102021204974.5, filed May 17, 2021, which is also incorporated herein by reference in its entirety.

Embodiments according to the present invention relate to an apparatus and a method for determining audio processing parameters in dependence on at least one audio input signal.

Embodiments according to the invention relate to an apparatus and a method with artificial intelligence, for example in a sound reproduction device, that can analyze audio signals and allocate them to user-individual settings during the user operation or can combine the same.

Further, embodiments relate to concepts for determining audio processing parameters based on audio signals obtained during user operation.

BACKGROUND OF THE INVENTION

The individual perception of sound and hence the individual requirements for the sound or euphony for their adaptation of sound reproduction devices differ according to the following criteria:

Individuality
Situational needs
External conditions

The sound perception differs from person to person. For example, a conversation with a person in a room with many people is for some people harder to conduct than for others. In addition, depending on the needs, the same adjustment of a sound reproduction is perceived differently. Environmental parameters, such as the auditory environment, also influence the control values for sound adaptation of a sound reproduction device significantly.

Current sound reproduction devices offer specific sound adaptations that are not applied in an automated manner. In sound reproduction devices, such as portable devices for hearing assistance, such as headphones, headsets or hearing aids, frequently only comprise volume regulation and equalizer for sound adaptation. Sound adaptation, such as amplifying the volume or the adaptation of higher or lower tones, is performed once by the user. It has been found that these adjustments have to be performed again for each further sound reproduction for obtaining a continuously good audio quality.

It has been found that in conventional concepts not only the process of sound adaptation has to be repeated for different sound reproductions, but that also in sound reproduction devices the changes of the auditory environment are not adapted adaptively, for example, to the environmental sounds. It has been found that it can happen that even with a relatively slight change of environmental noise the listening effort for speech comprehension increases.

Further, it has been found that in conventional concepts sound adaptations can be performed only based on sound default settings predetermined by the manufacturer. It has been found that the same do not at all times correspond to the individual needs of the users. Thus, there are, for example, settings like "music", wherein the taste in music and the personal intention when listening to music is not considered. For example, the expectation regarding the sound experience differs substantially between opera singing compared to techno music. In the default settings in the listening program "music", the manufacturer only takes general assumptions as a basis, which might possibly neither fulfill the requirements regarding the sound experience of opera singing nor of techno music, and hence provide the user with only insufficient sound reproductions.

Current sound reproduction devices for hearing assistance, such as hearing aids, can cost, depending on their features, several thousands of euros, such that the expectations on the device are accordingly high. Adaptations of hearing aids are generally performed under laboratory conditions, frequently with only two loudspeakers and only a very limited number of sounds, such as sinusoidal tones, noise and voice. Complex noise situations, such as at crossroads, cannot be simulated in the hearing laboratory and therefore result in frustrations of the hearing aid users and hardly satisfying results in everyday life.

In learning applications for sound reproductions, such as the Github publication "liketohear-ai-pt", situational parameter changes of a hearing aid algorithm recorded by users in a file and the recorded frequency spectrum analysis allocated to the situation are processed by a self-learning algorithm. The algorithm establishes the relevance of a specific frequency spectrum that is relevant to the decision of the user, and automatically selects the allocated parameters as basis for a prediction model. In a second step, the prediction model is applied to the previously recorded frequency spectrum analysis. It has been found that the complexity of the frequency spectrum cannot be mapped by means of this learning application for sound reproduction, such that further user adaptations are continuously needed.

Considering the above statements, there is a need for a concept for determining audio processing parameters at runtime resulting in an improved tradeoff between user-friendliness, obtainable audio quality and implementation effort.

SUMMARY

An embodiment may have an apparatus for determining audio processing parameters in dependence on at least one audio input signal; wherein the apparatus is configured to determine at least one coefficient of a processing parameter determination rule in a user-individual manner based on audio signals obtained during user operation; wherein the apparatus is configured to obtain the audio processing parameters by using the processing parameter determination rule based on the audio input signal; wherein the apparatus is configured to determine a database in dependence on the at least one audio input signal, such that entries of the database describe the audio input signal; wherein the apparatus is configured to determine the database in dependence on an audio output signal, which is obtained in dependence on a user parameter, such that entries of the database describe the audio output signal; wherein the apparatus is configured to adapt the at least one coefficient of the processing parameter determination rule based on the database acquired by the apparatus in order to adapt the processing parameter determination rule in a user-individual manner in order to obtain audio processing parameters that are adapted in a user-individual manner.

Another embodiment may have a hearing aid, wherein the hearing aid comprises audio processing; and wherein the hearing aid comprises an inventive apparatus for determining audio processing parameters, wherein the audio processing is configured to process an audio input signal in dependence on the audio processing parameters.

According to another embodiment, a method for determining audio processing parameters in dependence on at least one audio input signal may have the steps of: determining, in a user-individual manner, at least one coefficient of a processing parameter determination rule based on audio signals obtained during user operation; and obtaining audio processing parameters by using the processing parameter determination rule based on the audio input signal; wherein a database is determined in dependence on the at least one audio input signal, such that entries of the database describe the audio input signal; wherein the database is determined in dependence on an audio output signal, which is obtained in dependence on a user parameter, such that entries of the database describe the audio output signal; wherein the at least one coefficient of the processing parameter determination rule is adapted based on the database acquired by the apparatus in order to adapt the processing parameter determination rule in a user-individual manner in order to obtain audio processing parameters that are adapted in a user-individual manner.

Another embodiment may have a non-transitory digital storage medium having a computer program stored thereon to perform the inventive method for determining audio processing parameters in dependence on at least one audio input signal, when said computer program is run by a computer.

The core idea of embodiments of the present invention is the finding to carry out sound adaptations intuitively performed by users in runtime and to integrate the same into the learning system in real-time.

One embodiment according to the present invention includes an apparatus for determining audio processing parameters, such as parameters for audio processing, in dependence on at least one audio input signal, for example coming from an audio input, wherein the apparatus is configured to determine at least one coefficient of a processing parameter determination rule in a user-individual manner based on audio signals obtained during user operation, and wherein the apparatus is configured to obtain the audio processing parameters by using the processing parameter determination rule based on the audio input signal. Coefficients of a processing parameter determination rules can, for example, be coefficients of a neuronal network, which obtains the audio input signal or input signal parameters extracted therefrom as an input quantity and that provides the audio processing parameters as output quantity. In other words, the coefficients of the processing parameter determination rule can, for example, be determined in a user-individual manner based on input audio signals obtained in user operation, for example during user operation. Further, the apparatus can be configured to obtain the audio processing parameters, for example by using the processing parameter determination rule defined by the at least one coefficient based on the audio input signal.

This embodiment is based on the core idea that it becomes possible to adapt the processing parameter determination rule to the individual habits and desires of the user by user-individual adjustment of one or several coefficients of the processing parameter determination rule based on audio signals obtained during user operation. By using audio signals obtained during user operation for the user-individual adjustment of the coefficients of the processing parameter determination rule, it can be obtained that the coefficients are adapted well to those (specific) hearing situations where the user normally actually stays. Thus, it is no longer needed to pre-classify an acoustic environment (for example into a general category "music" and a general category "speech"), but the coefficients can be adapted to the actual listening environment where the user, for example, listens to music or speech and also to the individual needs of the user. For example, by a suitable selection of the coefficients of the processing parameter determination rule, immediate and user-individual determination of audio processing parameters can take place, wherein, for example, the processing parameter determination rule adapted by coefficients involves an immediate determination of the audio processing parameter, without categorization of the acoustic environment, into one or several statically predetermined categories. Rather, coefficients of the processing parameter determination rule can be adapted based on the audio signals obtained during user operation, such that the listening environments that are relevant to the user where the user desires different audio processing parameters can be differentiated in a "hard" or "soft" manner (for example with smooth transition).

Thus, by considering the audio signals obtained during user operation (and by a respective adjustment of the coefficients of the processing parameter determination rule), the inventive concept allows, for example, that very different audio processing parameters are provided when speech exists in different acoustic environments, where the user is located (for example loud open-plan office, single office, road crossings with many trucks, road crossing with trolley traffic, etc.). The provided parameters are typically aligned to the settings desired by the user in the respective situations.

In that way, the inventive concept provides audio processing parameters with reasonable effort, which are adapted to the everyday reality of an individual user and his or her specific preferences.

According to further embodiments, the apparatus is configured to determine a database in dependence on user parameters adjusted by the user, such that entries of the database describe the user parameters adjusted by the user. For example, the database can be established in real-time during user operation and a prediction model can be determined. Further, the database can be used for determining the coefficients of the processing parameter determination rule in that the database includes information of the user parameters. For example, the database can also include person-related control settings that can be linked to the user parameters. The user parameters adjusted by the user can, for example, replace the audio processing parameters as output quantities, or they can change the audio processing parameters, such that the entries of the database represent, for example, the user parameters adjusted by the user. For example, the database is integrated accordingly at least partly into reinforcement learning that uses, for example, user parameters adjusted by the user.

By establishing a database whose entries describe the user parameters adjusted by the users, the coefficients of the processing parameter determination rule can, for example, be successively improved or optimized. The user parameters adjusted by the user (typically in different acoustic environments) that form the database and that can be stored, for example, in a databank or another memory structure, can represent set values of audio processing parameters. If, for example, there is an allocation of user parameters to audio signals (or audio signal characteristics) of the respective acoustic environment where the user has selected the user parameters, this database can be used for determining the coefficients of the processing parameter determination rule.

By determining a database, which becomes, for example, bigger and bigger with increasing duration of the usage by the user, it can be obtained, for example, that over time a greater database exists for (automatic) determination (or improvement) of the coefficients of the processing parameter determination rule, which allows an increasing refinement or improvement of the stated coefficients (e.g. based on an increasing base of different listening environments where the user was located). Thus, by establishing and continuously extending the database, the user experience can be continuously improved.

According to a further embodiment, the apparatus is configured to determine a database in dependence on the at least one audio input signal, such that entries of the database represent the audio input signal. For example, the database can be used for determining the coefficients of the processing parameter determination rule. In other words, for example, at first, person-related control adjustments, for example, the user parameters adjusted by the user were stored, which are extended by sound information of the auditory environment as external conditions. Thereby, a data basis can be generated, which provides, for example, coefficients for the processing parameter determination rule by using reinforcement learning.

According to a further embodiment, the apparatus is configured to determine the database, such that the database describes an allocation between different audio input signals and respective user parameters adjusted by the user. In other words, the apparatus can, for example, allocate the external conditions based on the audio input signal and the person-related control settings, for example the user parameters adjusted by the user, to each other. This means that the allocation can serve, for example, as a basis for the prediction model, which can, for example, be changed ad hoc by further sound adaptations of the user, for example by integrating the respective user parameters adjusted by the user with the database (and then, for example, redetermination or improvement of the coefficients of the processing parameter determination rule takes place). For example, in the background, via the audio input, the auditory scene can be continuously recorded and/or analyzed and/or evaluated by means of microphones, such that, for example, an analysis of the auditory scene is generated via the dynamics and/or frequency and/or spectral characteristic. The analysis result of the auditory scene can, for example, be integrated into the database as environmental parameter and can be allocated to the user parameter to obtain a linkage of the user parameter and the audio input signal into the auditory environment for this respective time.

According to a further embodiment, the apparatus is configured to determine a database, for example for determining the coefficients of the processing parameter determination rule, in dependence on an audio input signal, such that entries of the database describe or represent the audio output signal. By determining the database in dependence on at least one audio input signal and on at least one audio output signal, the processing parameter determination rule, for example of reinforcement learning, can use the database for determining coefficients of the processing parameter determination rule, for example for a neuronal network. The coefficients of the processing parameter determination rule can, for example, be obtained by common processing of an audio input signal and an allocated output signal or by comparing the audio output signal to the audio input signal.

According to a further embodiment, the apparatus is configured to determine the database such that the database describes an allocation between different audio output signals and respective user parameters adjusted by the user. In other words, the database describes an allocation between different audio input signals, between different audio output signals and respective user parameters adjusted by the user to be able to determine coefficients of the processing parameter determination rule. By means of the established database, for example by analyzing the incoming and outgoing audio signal, sound processing can be integrated in the training of a self-reinforcement learning algorithm. For example, the incoming audio signal or the audio input signal can include the sound environment, for example, the auditory environment. In other words, by means of the established database, for example by analyzing the incoming and outgoing audio signals, the coefficients of the processing parameter determination rule can be selected such that the desired connection between audio input signal and audio output signal results at least approximately by the processing parameter determination rule.

According to a further embodiment, the apparatus is configured to adapt the at least one coefficient of the processing parameter determination rule based on the database acquired by the apparatus in order to adapt the processing parameter determination rule in a user-individual manner in order to obtain audio processing parameters that are adapted in a user-individual manner. In other words, for example the reinforcement learning user model is adapted based on artificial intelligence to obtain an audio processing parameter that is adapted in a user-individual manner or an audio signal adapted in a user-individual manner. For example, it is possible to learn and adapt changes of the sound environment, for example the auditory environment, and the user adjustment inherently in runtime. For example, audio processing parameters that are adapted in a user-individual manner can allow that audio signals that are adducted in a user-individual manner are obtained during user operation when processing the audio input signal by using the audio processing parameters. In other words, a user-specific parameter set for sound processing can be obtained or developed from the database, which, on the one hand applies the same control parameters in an automated manner during the same external conditions, but also allows further user adaptations in the situation itself, which are integrated into the apparatus as a learning system. For example, the learning system and the application can adapt itself to the sound preferences of the user in a continuous learning process.

According to a further embodiment, the apparatus is configured to provide and/or adapt the processing parameter determination rule based on the database. For example, the apparatus can use the database, for example, by using reinforcement learning, to provide the processing parameter determination rule in order to obtain audio signals that are adapted in a user-individual manner, by using the audio processing parameters, for example during the user operation.

According to further embodiments, the apparatus is configured to determine and/or adapt the at least one coefficient of the processing parameter determination rule based on at least one audio processing parameter corrected and/or amended by the user. As already mentioned, the apparatus can be configured to consider or adjust user adaptations of the user parameters during user operation and to allow, for example, further user adaptations of the user parameters at a later time and accordingly the same location or accordingly the same sound environment, such that the preceding user parameters are adjusted and/or overwritten with newly adjusted user parameters. In other words, coefficients of the processing parameter determination rule can be corrected by a user and/or amended audio processing parameters can be determined, for example in dependence on the sound environment at the respective time where the user is located.

According to a further embodiment, the apparatus is configured to perform audio processing, for example a parameterized audio processing rule, based on the audio input signal and based on the audio processing parameter, in order to obtain the audio signals that are adapted in a user-individual manner, for example by considering user modifications of the audio processing parameters. In other words, the apparatus can provide an audio signal for the audio output that is adapted in a user-individual manner, by means of an optional audio processing of the audio input signal and the audio processing parameters. For example, the audio processing can be integrated into the apparatus, which results in an efficient system. Optionally, audio processing can also be incorporated in the determination of the audio processing parameters.

According to a further embodiment, the apparatus is configured to determine the coefficients of the processing parameter determination rule by using a comparison of the audio input signal and an audio input signal provided by using the audio processing parameter, for example by considering user modifications of the audio processing parameter. In other words, the determination of the coefficients of the processing parameter determination rule can be based on a comparison between the audio input signal and the direct audio output signal or the audio output signal provided by the audio processing. For example, optionally, prior to or after usage of the comparison, an audio analysis of the audio input signal or an audio analysis of the audio output signal can take place to determine the coefficients of the comparison parameter determination rule based on an audio analysis result of the audio signals. Determining the coefficients of the parameter determination rule by using such a comparison provides particularly reliable or robust results, as the audio signals actually output to the user can be used as criterion for determining the coefficients of the parameter determination rule. The criterion that the audio output signal is to correspond to the one desired by the user, is more significant and robust than pure optimization of the audio processing parameter itself.

According to a further embodiment, the apparatus is configured to provide the user parameters adjusted by the user as output quantity instead of the audio processing parameters, wherein the user parameters adjusted by the user include volume parameters and/or sound parameters and/or equalizer parameters. In other words, user parameters can comprise, for example, filter parameters for sound design and/or for equalizing sound frequencies. By providing the user parameters adjusted by the user as output quantity, for example, immediate user intervention is enabled, which results in a particularly good using experience. A user intervention can additionally be used for improving the coefficients in order to prevent future user interventions if possible (and to obtain instead automatically an adjustment adapted to user requirements).

According to a further embodiment, the apparatus is configured to combine the user parameters with the audio processing parameters, for example by addition, to obtain combined parameters of the audio processing and to provide the same as output quantity. Combined parameters can comprise, for example, user parameters and audio processing parameters that are provided in a combined manner to the audio processing, or are combined by using the audio processing and are provided as output quantity, for example to the reinforcement learning. Accordingly, fast user intervention is possible and the audio processing can be adapted to the user requirements.

According to a further embodiment, the apparatus is configured to perform audio analysis of the audio input signal to provide an audio input signal analysis result for determining the at least one coefficient of a processing parameter determination rule, for example by using the processing parameter determination rule. For example, the processing parameter determination rule can define a derivation rule for deriving the audio processing parameters from the audio input signal analysis result. The audio analysis of the audio input signal can provide audio input signal analysis results, for example in the form of information on spectral characteristics and/or dynamics and/or frequency of the audio input signal, or also as information on intensity values per band. The audio input signal analysis results can here, for example, be provided as input quantities for determining the one or the coefficients of the processing parameter determination rule, for example by using reinforcement learning. Here, embodiments further provide that the audio analysis analyzes and evaluates the audio input signal coming from the audio input in advance, in order to provide the same to the processing parameter determination rule, wherein this is not mandatory. For example, it is possible to obtain additional information on spectral characteristics of the audio input signal as audio input signal analysis result. Further, by using an audio input signal analysis result, the processing parameter determination rule can be configured in a simpler manner compared to the case where, for example, the complete audio input signal is used for determining audio processing parameters. In that way, parameters or values of the audio input signal analysis result can describe the essential characteristics of the audio input signal in an efficient manner, such that the processing parameter determination rule comprises a comparatively small number of input variables (namely, for example) parameters or values of the audio input signal analysis result, and can therefore be implemented in a comparatively simple manner. In that way, good results can be obtained with little effort.

According to a further embodiment, the apparatus is configured to perform audio analysis of the audio input signal to provide an audio output signal analysis result, for example in the form of information on spectral characteristics of the audio input signal for a determination of the at least one coefficient of the processing parameter determination rule, for example by using the processing parameter determination rule. In other words, the apparatus is configured to perform audio analysis before the processing parameter determination rule or after the processing parameter determination rule in order to provide either an audio input analysis signal result or an audio output signal analysis result or both for determining the coefficient of the processing parameter determination rule. For example, by determining the audio output signal analysis result, it is particularly easy to compare the audio input signal and the audio output signal, wherein, for example, values or parameters of the audio output signal analysis result can describe the characteristics of the audio output signal in a particularly efficient manner (or in particularly compact form). Thereby, determination or optimization of the coefficients of the processing parameter determination rule is possible in a particularly efficient manner, wherein obtaining processing desired by the user can take place, for example, by evaluating the audio output signal analysis result in an efficient manner, or wherein a comparison between audio input signal analysis result and audio output signal analysis result can allow conclusions on coefficients of the processing parameter determination rule.

According to a further embodiment, the audio processing parameter/s include/s at least one multiband compression parameter R and/or at least one hearing threshold adaptation parameter T, and/or at least one band-dependent amplification parameter G, and/or at least one disturbing noise reduction parameter, and/or at least one blind source separation parameter. Further, the audio processing parameters can include at least one sound direction parameter and/or binaural parameters and/or parameters on the number of different speakers and/or parameters of adaptive filters in general, for example, Hall suppression, feedback, echo cancellation, active noise cancellation (ANC). For example, by means of a sound direction parameter, the directivity of the sound source can be selected or adjusted, such that the sound is only processed from the desired direction, for example, the dialog partner of a conversation, for the combination of the audio processing parameters. It has been found that such audio processing parameters can influence audio signal processing in an efficient manner, wherein influencing the audio signal processing across a wide adjustment range is already possible with a small number of parameters that can be determined easily by a processing parameter determination rule.

According to a further embodiment, the apparatus can include a neuronal network that implements, for example, the processing parameter determination rule, such that the at least one coefficient is defined, or a plurality of coefficients are defined, which are configured to obtain the audio processing parameters by using the processing parameter determination rule. Further, the neuronal network can be configured to obtain the audio processing parameters based on the audio input signal directly from the audio input or by means of the interconnected audio analysis as an analyzed audio input signal. It has been found that a neuronal network is well suited for determining the audio processing parameters and can be well adapted to the personal perception of the individual user by the coefficients. The neuronal network whose edge weights can be defined, for example, by the coefficients of the processing parameter determination rule can be adapted to the needs of the user by the selection of the coefficients (which can take place, for example, by a training rule). The coefficients can be improved, for example, successively when further user adjustments exist. Thereby, results offering a very good user experience can be obtained.

According to a further embodiment, the apparatus is configured to provide and/or adapt the processing parameter determination rule based on a method of reinforcement learning and/or based on a method of unsupervised learning and/or based on a method of multivariate prediction and/or based on a multidimensional parameter space determined by multivariable regression to determine the audio processing parameter. The processing parameter determination rule can provide, for example, coefficients for the neuronal network that are based, for example, on the method of reinforcement learning. The method of multivariate prediction can include, for example, prediction of frequency bands and/or prediction of input/output characteristics according to the user parameters. Further, the method with multivariable regression can analyze, for example, all existing frequency bands to determine a multidimensional parameter space. A multidimensional parameter space can be, for example, a two-dimensional parameter setting comprising a graphical surface where the user parameters can be adjusted and continuously adapted by the user, for example, by means of a slider or a point on a coordinate system whose axes have or are allocated to volume adjustments and sound adjustments. By means of the above-stated methods, the apparatus can determine the audio processing parameter, such that, for example, a learning algorithm adjusts user-individual audio processing parameters, for example such that the audio processing parameters provided by applying the processing parameter determination rule approximate to the audio processing parameter corrected by the user with increasing learning progress, for example such that the processing parameter determination rule adapts itself in a continuous learning process, for example in dependence on user adaptations of the audio processing parameters. As expected, for example, access of the methods to the database or the data memory is unlimited (such that, for example, with increasing size of the database, ever better coefficients can be determined by using the stated learning methods).

According to a further embodiment, the apparatus is configured to obtain the user parameters adjusted by the user, for example, via or by means of an interface, for example, a user interface, an intuitive and/or ergonomic user control such as a 2D-space on a display of a smartphone. In other words, the apparatus can include an interface (for example an electric interface or also a man-machine interface) in order to adjust the user parameters. A visual user control can include volume adjustment, for example, by means of a slider for louder and quieter and/or height and depth regulation. In that way, the adjustment of the parameter can be made very easy for the user, wherein it has been found that this simple sound adjustment in many cases already results in a good hearing impression.

According to a further embodiment, the audio input signal includes a multichannel audio signal, having, for example, at least four channels or at least two audio channels. For example, the audio input signal can be provided by the audio input, for example, from, via or by means of a microphone. Further, the audio input signal can include information such as the number of channels and/or the number of frequency bands. The usage of multichannel signals allows, for example, localization of desired and/or disturbing sound sources as well as considering directions of the desired or disturbing sound sources when determining the audio processing parameter or the coefficients of the processing parameter determination rule.

According to a further embodiment, the apparatus is configured to perform audio processing separately for at least four frequency bands of the audio input signal. In that way, it can be ensured that frequency selectivity is provided in order to be able to analyze each individual frequency, for example, if the audio input signal includes a multichannel audio signal. Considering the different intensities in different frequency bands allows considering different acoustic environments and also considering the specific desires of the user regarding the frequency response in an efficient manner.

According to a further embodiment, the apparatus is configured to determine the at least one coefficient of the processing parameter determination rule in a user-individual manner, for example, continuously, successively, during user operation, for example, in real time to obtain the audio processing parameters in real time, for example, in run time during user operation and/or to determine and/or adapt to the amended audio processing parameters in real time. In other words, the apparatus is configured, for example, to determine and/or adapt the audio processing parameters in real time such that the apparatus as learning system performs this learning process in real time, for example, during user operation. In other words, in the present invention, for example, sound processing is controlled based on external conditions measured in real time. Thus, analysis of all existing frequency bands also takes place in real time such that the prediction model can be provided based on a multidimensional optimization in real time, which means, for example, an optimization where the audio processing parameters are determined based on the analyzed frequency bands and the user parameters stored in the data memory.

According to a further embodiment, the present invention includes a hearing aid, wherein the hearing aid comprises audio processing and wherein the hearing aid comprises an apparatus for determining audio processing parameters, wherein the audio processing is configured to process an audio input signal in dependence on the audio processing parameters. For example, the hearing aid can implement or integrate the apparatus to improve the individual perception of sound or tones in the form of audio signals for the user. It has been shown that the apparatus described herein is particularly well suitable for the usage in a hearing aid and that the hearing impression can be significantly improved by the usage of the inventive concept.

An embodiment according to the present invention includes a method for determining audio processing parameters in dependence on at least one audio input signal, wherein the method comprises determining, in a user-individual manner, at least one coefficient of a processing parameter determination rule based on audio signals obtained during user operation and obtaining audio processing parameters by using the processing parameter determination rule based on the audio input signal. The method is based on the same considerations as the above-described apparatus and can optionally be supplemented by all features, functionalities and details that have been described herein with respect to the inventive apparatus. The method can be supplemented by the stated features, functionalities and details both individually and in combination.

A further embodiment according to the present invention includes a computer program with a program code for performing the method when the program runs on the computer.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed in more detail based on the drawings, it should be noted that identical, functionally equal or equal elements, objects and/or structures are provided with the same reference numbers in the different figures, such that the description of these elements illustrated in different embodiments is interchangeable or inter-applicable.

Embodiments described below are described in the context of a plurality of details. However, embodiments can also be implemented without these detailed features. Further, embodiments are described by using block diagrams instead of a detailed representation for easier understanding. Further, details and/or features of individual embodiments can be easily combined with one another as long as it is not explicitly described to the contrary.

Figure 1:
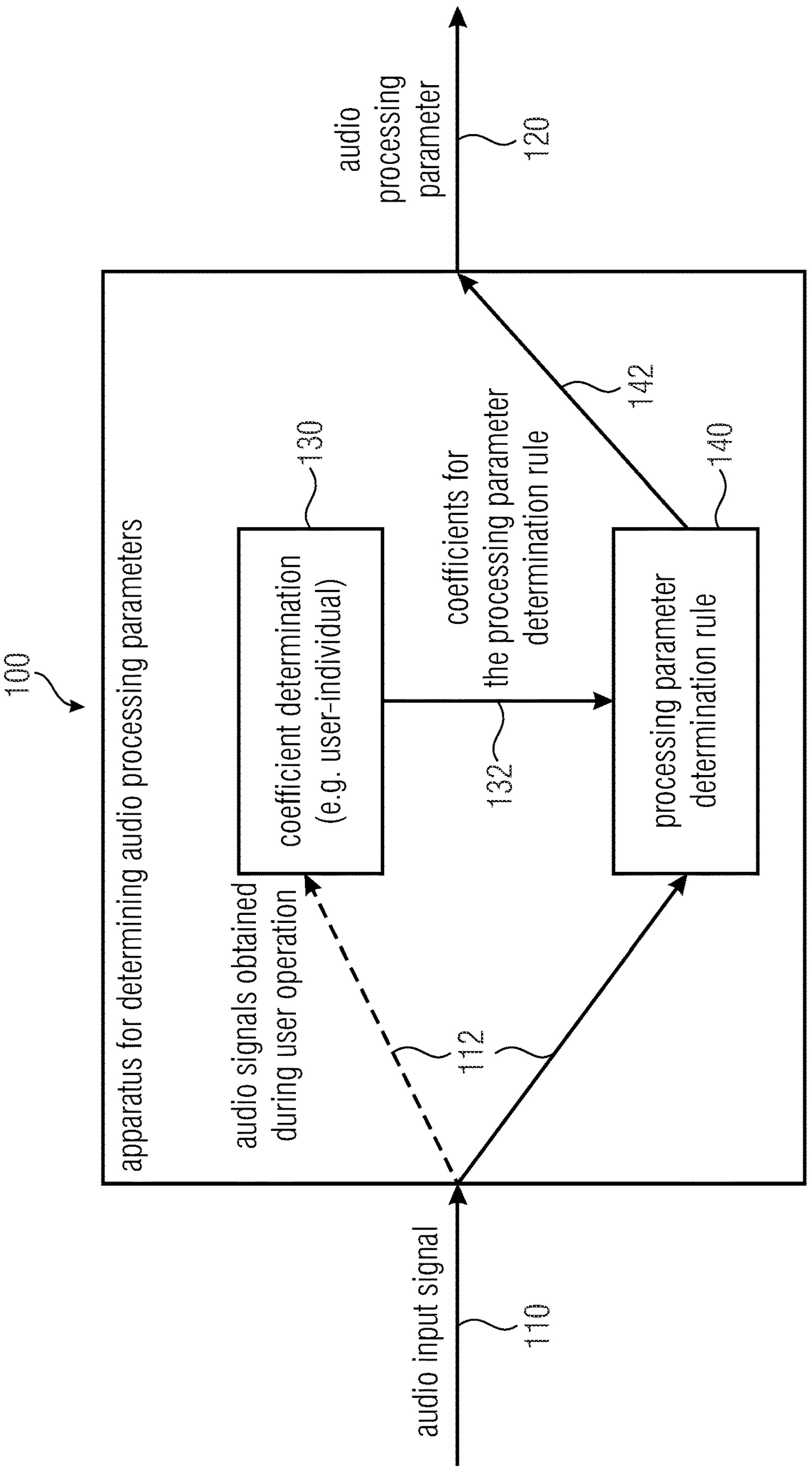
FIG. 1 is a schematic block diagram of an apparatus according to an embodiment that determines audio processing parameters in dependence on at least one audio input signal.

FIG. 1 shows a schematic block diagram of an apparatus 100 for determining audio processing parameters 120 that are illustrated on the output side of the apparatus 100 in dependence on at least one audio input signal 110 that is illustrated on the input side of the apparatus 100. The exemplary schematic illustration of the apparatus 100 includes, for example, determining coefficients, which is illustrated by the block coefficient determination 130, such that coefficients 132 of the coefficient determination 130 can be provided to the processing parameter determination rule 140. The audio input signal 110 can be used, for example, directly by the processing parameter determination rule 140 to obtain the coefficients 142 of the processing parameter determination rule 140 and/or can be used as audio signal 112 obtained during user operation by the coefficient determination 130 to provide the coefficients 132 to the coefficient determination 130. For example, coefficient determination 130 can take place in a user-individual manner during user operation, such that the coefficients 132 are provided to the coefficient determination 130 of the processing parameter determination rule 140 to obtain the audio processing parameters 120 by using the processing determination rule 140 based on the audio input signal 110.

Thus, the coefficients of the processing parameter determination rule can be adjusted, for example, such that the processing parameter determination rule provides audio processing parameters as output based on the audio input signal and by using the coefficients that result, when using in an audio processing, in an audio output signal that meets the expectations of the user.

Figure 2:
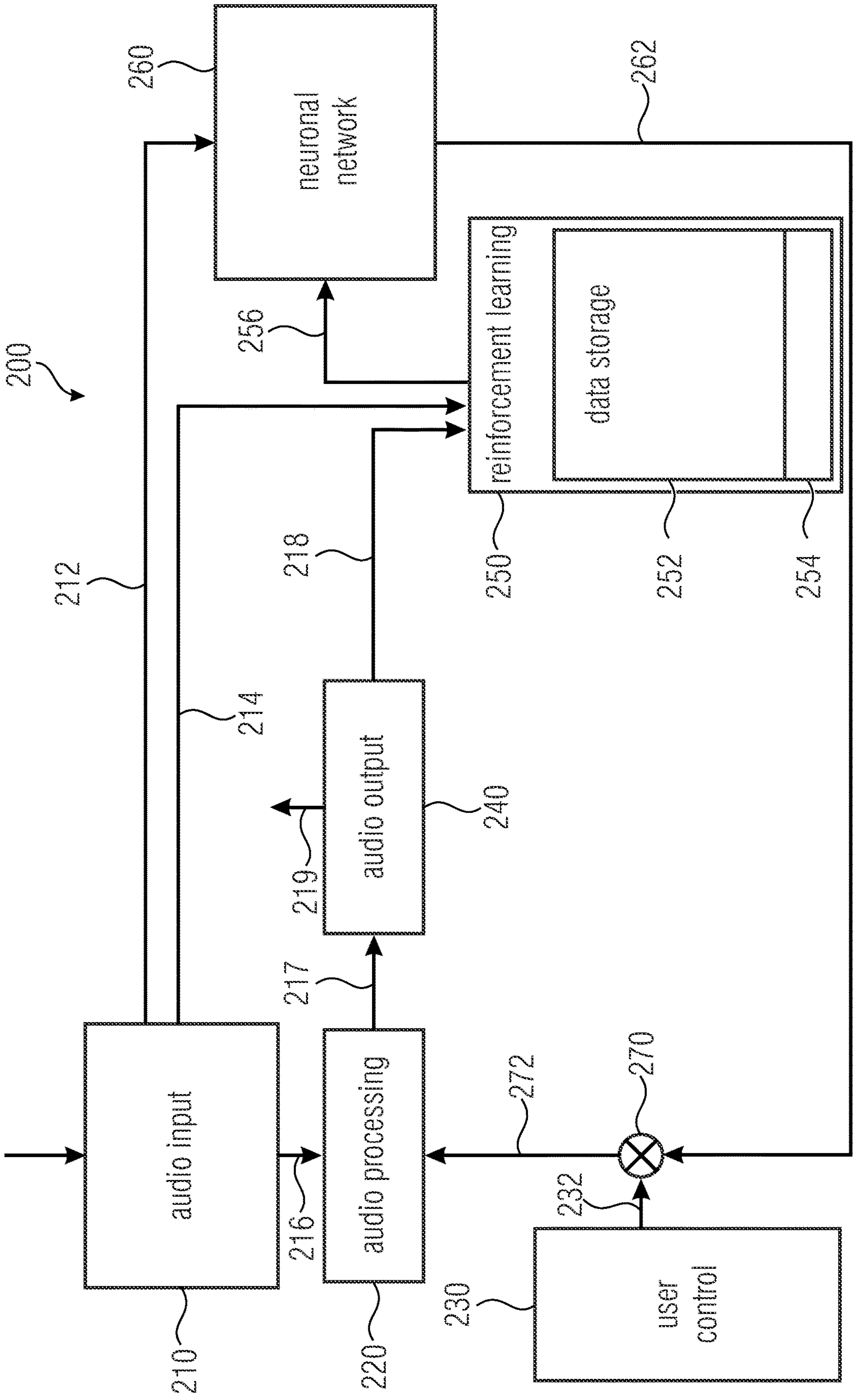
FIG. 2 is a schematic block diagram of an apparatus according to an embodiment that determines audio processing parameters in dependence on at least one audio input signal and by means of reinforcement learning based on an audio input signal and an audio output signal.

FIG. 2 shows a schematic block diagram of an apparatus 200 according to an embodiment. The illustrated apparatus 200 for determining audio processing parameters includes, for example, an audio input 210, an audio processing 220, a user control 230, and audio output 240, a processing determination rule (or processing parameter determination means) in the form of reinforcement learning 250 and a neuronal network 260.

The audio input 210 can include, for example, a microphone or another audio detection device and can include, for example, information on the number of channels, for example, "C" and/or information on the number of frequency bands, for example, "B". For example, a tone, a sound or a soundwave, or generally an audio signal can be received via the audio input 210 and can be provided as audio input signal 212, 214 and 216, for example, for the audio processing 220 and/or for the reinforcement learning 250 and/or for the neuronal network 260. For example, the audio signal 212 for the neuronal network 260, the audio signal 214 for the reinforcement learning 250 and the audio signal 216 for the audio processing 220 can be provided (wherein the audio signals 212, 214, 216 can be the same or can differ, for example, in detail (for example, with regard to sampling rate, frequency resolution, bandwidth, etc.). Here, the audio signal 212 can accordingly be equal to the audio signal 214 and/or the audio signal 216 (or at least describe the same audio content) and can have the corresponding same information on the number of frequency channels and frequency bands, such that the audio signal is directly divided by the audio input 210, for example, without further audio analysis and can be provided, for example, via several outputs or data paths of the audio input 210.

The audio processing 220 can comprise, for example, one and/or several parameterized audio processing rules that process one or several audio signals 216, for example, such that an audio signal 217 that is adapted in a user-individual manner is provided (or several audio signals that are adapted in a user-individual manner are provided) based on the incoming audio signal 216 (or the incoming audio signals) by using the parameterized audio processing rule which is parameterized, for example, by the combined parameters 272. Audio processing 220 allows processing the audio input signal 216, which is based on the audio input 210, by using the combined parameters 272, for example, by using the parameterized audio processing rule to obtain the audio signal 210 which is adapted in a user-individual manner. Optional details and embodiments regarding the combined parameters 272 will be discussed in more detail below in the present patent application. Before that, further details and embodiments regarding the components of the apparatus 200 will be described.

The audio output 240 can, for example, receive the audio signal 217 which has been adapted in a user-individual manner and has been amended and newly allocated and can provide the same as an amended or processed audio signal 218 for determining parameters or coefficients of the processing parameter determination rule (for example, the neural network 260) to a coefficient determiner 250 that is realized, for example, by using reinforcement learning. Alternatively or additionally, the audio output can provide, for example, the audio signal 217 that has been amended, newly allocated and adapted in a user-individual manner by the audio processing 220 as an amended or processed audio signal 219 for an interface, for example, for headphones or loudspeakers, wherein this is not mandatory.

Further, embodiments allow that additional information of the audio signal 218 are provided via the audio output 240 to the reinforcement learning 250 (or another means for determining coefficients or parameters of the processing parameter determination rule), for example, to supply a data storage 252 (whose content can be part of a database) with information on audio signals.

Like the audio input signal 214, the audio output signal 218 can be provided, for example, to the reinforcement learning 250 for determining coefficients or parameters of the processing parameter determination rule 260, such that, for example, the information of the audio input signal 214 and the audio output signal 218 are stored in a data memory 252 as a respective database of the apparatus 200.

In other words, for example, by means of the audio signals 218 and 214, the reinforcement learning 250 can determine coefficients or parameters of the processing parameter determination rule 260. Further, the reinforcement learning 250 can increase, for example, the database based on the audio signals 214, 218 and/or incorporate the audio signals 214, 218 into the data storage 252. Alternatively or additionally, the reinforcement learning can determine at least one user adapted coefficient 254 or store the same in the database.

However, it should be noted that the usage of the output audio signal 218 by reinforcement learning 250 (or by another apparatus for determining the coefficients of the processing parameter determination rule, which can replace the reinforcement learning 250) is considered to be optional.

The database or the data storage 252 can include a plurality of information, for example, information on the audio input 210 (or on an audio input signal) and/or on one or several of the audio signals 212 and 214 coming from the audio input 210 and/or information on the audio output 240 and/or on the audio signal 218 coming from the audio output 240 and/or information on and for the audio processing 220 and, for example, also at least one user-adapted coefficient 254. User adapted coefficients 254 can be coefficients that are determined, for example, for usage by the processing parameter determination rule 250 based on the database 252 and/or based on an adjusted user parameter 232. User-adapted coefficients can also be parameters of the audio processing adjusted by the user.

The coefficients of the processing parameter determination rule, i.e. for example, edge weights of the neuronal network can be based, among others, on a method of reinforcement learning which is referred to in FIG. 2 with reference number 252 as "reinforcement learning".

For example, the reinforcement learning 250 (for example, as a partial function) can determine the database or the content of the data storage 252 such that the data storage 252 describes an allocation between different audio input signals 212, 214 and respective user parameters 232 adjusted by the user, for example, a user-adapted coefficient 254.

In that the reinforcement learning 250 determines, for example, the database or the content of the data storage 252 such that the data storage 252 (for example, additionally) describes an allocation between the audio output signal 218 and respective user parameters adjusted by the user, for example, a user-adapted coefficient 254, coefficients 256 of the neuronal network can be provided by the reinforcement learning 250 in an advantageous manner.

Above that, the processing parameter determination rule can be configured as neuronal network 260 or can be integrated in a neuronal network in order to obtain audio processing parameters 262 by using the coefficient 256 determined by reinforcement learning 250, for example. In other words, for example, the neuronal network 260 can determine the audio processing parameters 262 based on the audio signal 212 and the coefficients 256 obtained by the reinforcement learning 250 such that, as a result, for example, a learning algorithm adjusts user-individual audio processing parameters 262.

The at least one audio processing parameter 262 provided by the neuronal network 260 can be a single parameter or can include several parameters. The neuronal network 260 can provide, for example, one or several of the following parameters as audio processing parameter 262: a parameter of the user profile N and/or a multiband compression parameter R and/or a hearing threshold adaptation parameter T and/or smoothings (for example, one or several smoothing parameter) and/or compression adjustments (or one or several compression parameters). Further, for sound adaptation (alternatively or additionally) one or more parameters can be used (or provided by the neuronal network as audio processing parameter 262), such as a band-dependent amplification G, a disturbing noise reduction (or one or several disturbing noise reduction parameters) and/or a blind source separation (or one or several parameters of a blind source separation).

For example, the number of input parameters (for example the reinforcement learning 250 and/or of the neuronal network 260) can result in dependence on a number C of channels of a multichannel audio signal and also in dependence on a number B of the processing bands or in dependence on a number P of the user parameters. For example, the number of user parameters P can result as the product of the number of frequency bands B and the number of audios signals or audio channels C.

Alternatively or additionally, the input parameters (for example of the reinforcement learning or the neuronal network) can include audio features N for example F=2048 Fourier coefficients per channel for input (for example the audio input signal) and output (e.g. the audio output signal), for example every 10 ms.

For example, the number of output parameters (for example the output parameter of the neuronal network 260 or the input parameter of the audio processing) in a learned user profile M can consist of the number of audio channels (for example C), the hearing threshold adaptation T, the multiband compression with rate R, the band-dependent amplification G and two further time constants, wherein the number of values of G, R, T corresponds, for example, to the number of bands B. Further, the value of the learned user profile M (or the values of a learned user profile M) can form the user-adapted coefficient (or parameter) 254 (or a set of user-adapted coefficients or parameters).

The user control 230 provides at least one user parameter 232, which can include, for example, parameters of volume and/or parameters of sound regulation. The user control can for example include an interface for visualizing the one or several user parameters.

A volume control or volume regulation that can take place by the user control 230 can provide, for example, parameters that effect an amplification or attenuation of the audio signal. By means of a depth regulator, a height regulator and/or an equalizer, the user can adjust, for example, parameters of sound regulation via the user control 230, which can be combined, for example, as part of the user parameters 232 with the audio processing parameters 262 (provided by the neuronal network 260) by using a combination 270.

In other words, the user parameters 232 provided by the user control 230 can be combined with the audio processing parameter 262, for example by addition multiplication division or subtraction. By the combination 270 of the user parameters 232 with the audio processing parameters 262, for example, combined parameters 272 can be provided to the audio processing 220. Alternatively, the user parameters 232 can also replace the parameters 262, for example, when the user wants a significantly different adjustment than predetermined by the parameters 262.

In summary, it can be stated that the apparatus 200 processes an audio input signal obtained via the audio input 210 in the audio processing 220 to adapt sound characteristics to the desires or needs of a user. A processing characteristic of the audio processing 220 is adjusted by the parameters 272, wherein the parameters 272 are influenced, on the one hand, by the neuronal network 260 and can be modified, on the other hand, by the user via the user control 230. Generally, the reinforcement learning 250 fulfills the function of adapting one or several coefficients (e.g. edge weights) of the neuronal network, such that the parameters provided by the neuronal network essentially correspond to the user expectations, i.e. comprise, within acceptable tolerances, the parameter values that the user adjusts via the user control 230 in respective different acoustic environments.

Thus, it can be obtained that after sufficient training in many different acoustic environments, the apparatus reaches an automatic setting of the audio processing that is agreeable for the user.

Figure 3:
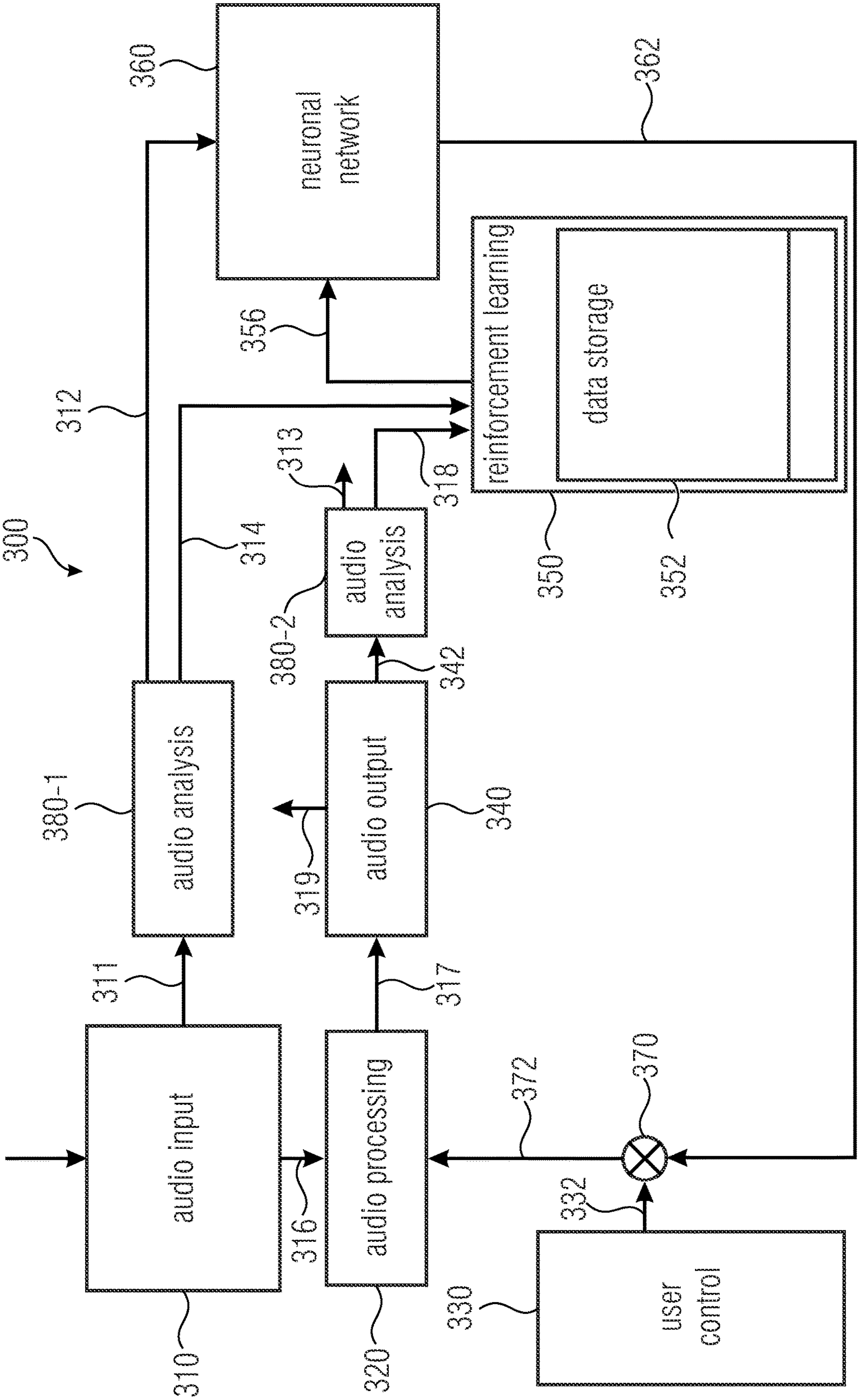
FIG. 3 is a schematic block diagram of an apparatus according to an embodiment that determines audio processing parameters in dependence on at least one audio input signal and by means of reinforcement learning based on an audio analysis of the audio input signal and an audio analysis of the audio output signal.

FIG. 3 shows a schematic illustration or a schematic block diagram of an apparatus 300 for determining audio processing parameters in dependence on at least one audio input signal that is based on the apparatus 200 of FIG. 2.

It should be noted that in the apparatus 300 according to FIG. 3, functional blocks that are also shown in FIG. 2 can have, for example, a similar or equal functionality as respective functional blocks in the apparatus 200 (but do not necessarily have to comprise them). Further, it should be noted that the apparatus 300 could optionally be supplemented by all features, functionalities and details that are described herein, both individually and in combination.

Like the apparatus 200, the apparatus 300 has an audio input 310 (which can correspond to the audio input 200), an audio processing 320 (which can correspond to the audio processing 220), a user control 330 (which can correspond to the user control 230), an audio output 340 (which can correspond to the audio output 240), a reinforcement learning 350 (which can correspond, for example, to the reinforcement learning 250 in terms of its basic function), a neuronal network 360 (which can correspond, for example, to the neuronal network 260 in terms of its basic function) and the combination 370 of the user parameter 332 that is adjusted in a user-individual manner and the audio processing parameter 362 (which can correspond, for example, to the combination 270).

Starting from the apparatus 200 of FIG. 2, the apparatus 300 of FIG. 3 additionally includes or comprises an audio analysis 380-1 between the audio input 310 and the neuronal network 360 as well as an audio analysis 380-2 between the audio output 340 and the reinforcement learning 350.

In particular, this arrangement allows the audio analysis 380-1 to receive and to analyze, for example, the audio input signal 311 outgoing from the audio input 310 in order to provide an audio input signal analysis result, for example information on spectral characteristics and/or dynamics and/or frequency of the audio input signal 311 in the form of the audio analysis signal 312 and/or 314. The information of the audio analysis result of the audio analysis 380-1 can be provided, for example, to the neuronal network 360 and the reinforcement learning 350 (for example simultaneously) via the analyzed audio signals 312, 314.

The processing parameter determination rule, which can include, for example, part of the neuronal network 360 (or part of the reinforcement learning 350) or which is implemented by the neuronal network 360 can define, for example, a derivation rule for deriving the audio processing parameters 362 from the audio input analysis result. By means of the audio analysis 380-1, additional (or compact) information on spectral characteristics, for example, an intensity value per frequency band and channel can be obtained, for example, to provide a frequency selectivity for audio signals (for example for multichannel audio signals). The frequency selectivity has to be able to analyze and represent the perceivable sound aspects of the signal. Generally, the audio analysis 380-1 can significantly reduce an input data amount of the neuronal network, for example compared to a concept where time domain sample values are input in the neuronal network. For example, in that the analyzed audio signals 312, 314 include parameters describing characteristics of the audio input signal in compact form (wherein a number of parameters per time portion is, for example, at least a factor 10 or at least a factor 20 or at least a factor 50 lower than a number of samples per time unit), the complexity of the neuronal network 360 can be kept comparatively low. Accordingly, the number of coefficients of the neuronal network can be kept comparatively low, which eases a learning process (for example by the reinforcement learning 350). This applies the more, the better the parameters of the analyzed audio signals are suitable to distinguish different acoustic environments.

Additionally and optionally, an audio analysis 380-2 of the audio output signal 342 can be performed to provide an audio output signal analysis result for determining at least one coefficient of the processing parameter rule, for example, at least one coefficient of the reinforcement learning 350.

A "common" audio analysis of the audio input signal 311 and the audio output signal 342 (for example an audio analysis of both the audio input signal and the audio output signal) is also possible, wherein separate audio signal analysis results can be provided. In this context, separate means that the audio input signal analysis results can be provided, for example, to other components compared to the audio output signal analysis result. For example, the information of the audio analysis 380-1, 380-2 of the input or output signal can be different from each other or can accordingly be similar or the same.

Here, embodiments provide that the audio output 340 provides an amended or processed audio signal 319 for an interface, for example for headphones or loudspeakers, wherein this is not mandatory. Further, embodiments allow that the audio analysis 280-2 provides the audio signal 313 for the interface or for a further interface. Thereby, the apparatus 300 can provide the audio signal 319 and 313, for example, via at least one interface for external components, wherein this is not mandatory.

In summary, it can be stated that in the apparatus 300 not the input audio signal or the output audio signal themselves are supplied to the neuronal network 360 or the reinforcement learning 350, but one or several respective audio analysis results. Thus, by suitable advance analysis of the input audio signal and/or the audio output signal, a complexity of the neuronal network and thereby also a complexity of reinforcement learning can be kept low, which significantly reduces the implementation effort.

Figure 4:
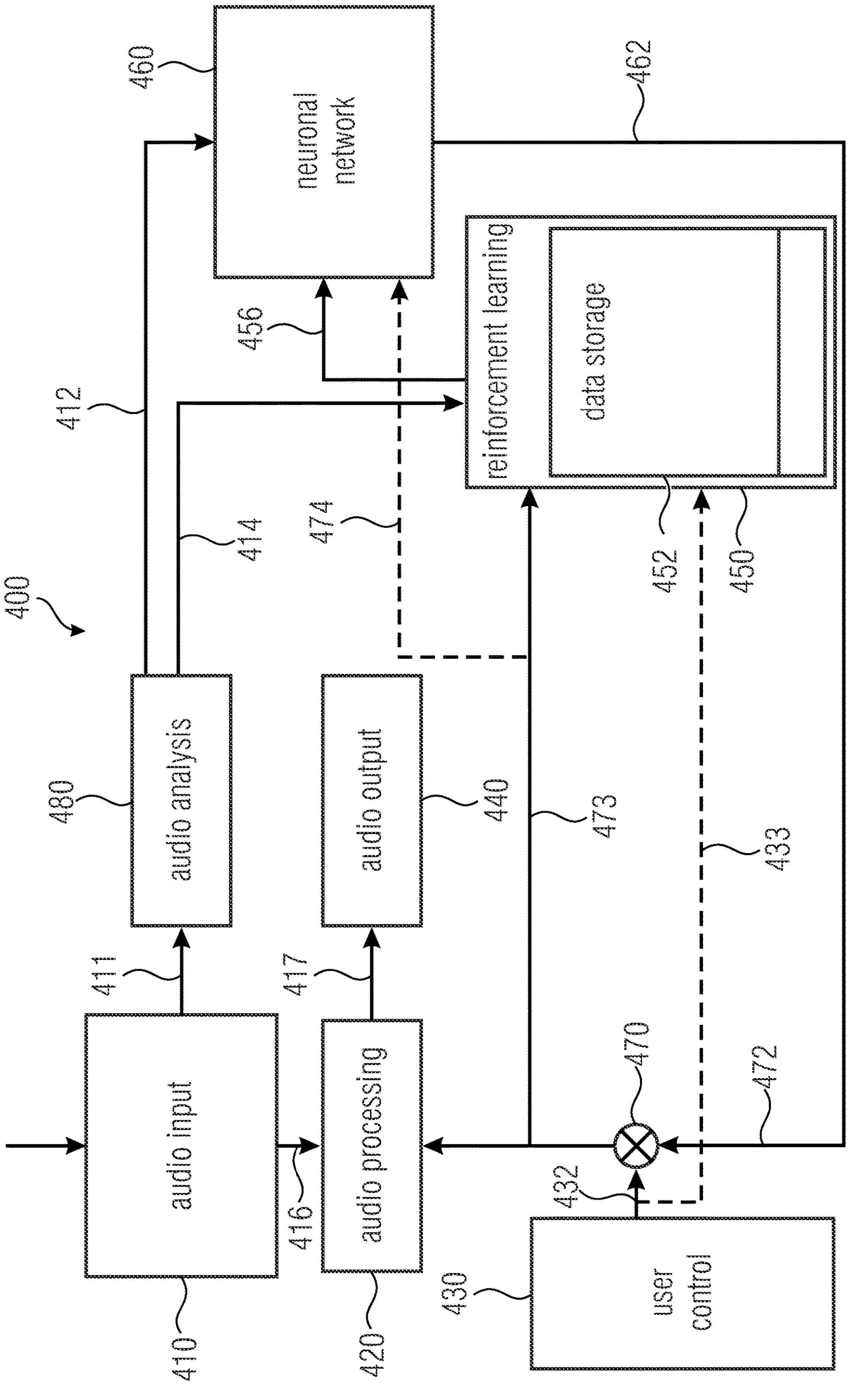
FIG. 4 is a schematic block diagram of an apparatus according to an embodiment that determines audio processing parameters in dependence on at least one audio input signal and by means of reinforcement learning based on an audio analysis of the audio input signal and user parameters adjusted by the user.

FIG. 4 shows a schematic block diagram of an apparatus 400 for determining audio processing parameters in dependence on at least one input signal that is partly based on the apparatus 200 of FIG. 2.

It should be noted that in the apparatus 400 according to FIG. 4, functional blocks that are also shown in FIG. 2 can have, for example, a similar or the same functionality as respective functional blocks in the apparatus 200 (but do not necessarily have to comprise the same). Further, it should be noted that the apparatus 400 can optionally be supplemented by all features, functionalities and details that are described herein both individually and in combination.

The apparatus 400 includes an audio input 410 (which can correspond, for example, to the audio input 210), an audio processing 420 (which can correspond, for example, to the audio processing 220), a user control 430 (which can correspond, for example, to the user control 230), an audio output 440 (which can correspond, for example, to the audio output 240) a reinforcement learning 450 (which can correspond, for example, to reinforcement learning 250 in terms of its basic function), a neuronal network 460 (which can correspond, for example, to the neuronal network 260 in terms of its basic function), a combination 470 (which can correspond, for example, to the combination 270) and an audio analysis 480 (which can correspond, for example, to the audio analysis 380-1) between the audio input 410 ad the neuronal network 460 and the reinforcement learning 450.

Compared to the apparatus 300, the apparatus 400 does not include an audio analysis of the audio output 440 and compared to the apparatus 200, no audio output signal is provided to the reinforcement learning 450 coming from the audio output 440. In other words, the reinforcement learning 450 receives no information on the audio output signal.

Instead, reinforcement learning 450 is based on the combined parameters 472, 473 or on information 433 describing changes or adaptations of the audio processing parameters 462 provided by the neuronal network 460 by the user. Further, reinforcement learning uses the audio input signal analysis result 414.

In other words, the reinforcement learning 450 can determine a database 452 in dependence on user parameters adjusted by the user or the combined parameters 472, 473, such that entries of the database 452 represent the user parameters 472, 473 adjusted by the user. The database 452 can be provided or used for determining the coefficients 456 of the processing parameter determination rule or the neuronal network 460. Thereby, a prediction model can be determined, which is directly based on user parameters (or the audio signal processing parameters 472 adapted by the user) that are directly allocated to the reinforcement learning 450.

Optionally, one or several combined parameters 472, 473 or user parameters can also be incorporated directly into the neuronal network by means of the combined parameter 474 460, such that, as output, for example, the compressor settings and/or other parameters can be provided for the audio processing parameters 462.

Alternatively or optionally, the respective user parameters 432 adjusted by the user can be provided directly to the reinforcement learning 450 (as shown at reference number 433), wherein this is not mandatory. For example, information on how the user changes the parameters 462 provided by the neuronal network 460 can be used for reinforcement learning. If the user does change the parameters 462 provided by the neuronal network 460 not at all or only slightly, it can be assumed that the user is completely satisfied with the current functionality of the neuronal network or at least to a large extent, such that coefficients of the neuronal network do not have to be amended at all or only slightly. If, however, the user performs significant changes of the parameters 462, it can be assumed by the reinforcement learning that a significant change of the coefficients of the neuronal network is needed in order to obtain that the parameters 462 provided by the neuronal network correspond to the user expectations. In that way, for example the information 433 describing a user intervention can be used by the reinforcement learning to trigger learning and/or to determine an extent of the changes of the coefficients of the neuronal network.

Overall, the embodiment according to FIG. 4 enables efficiently learning and/or (e.g. continuously) improving the coefficients 456 of the neuronal network 460.

Figure 5:
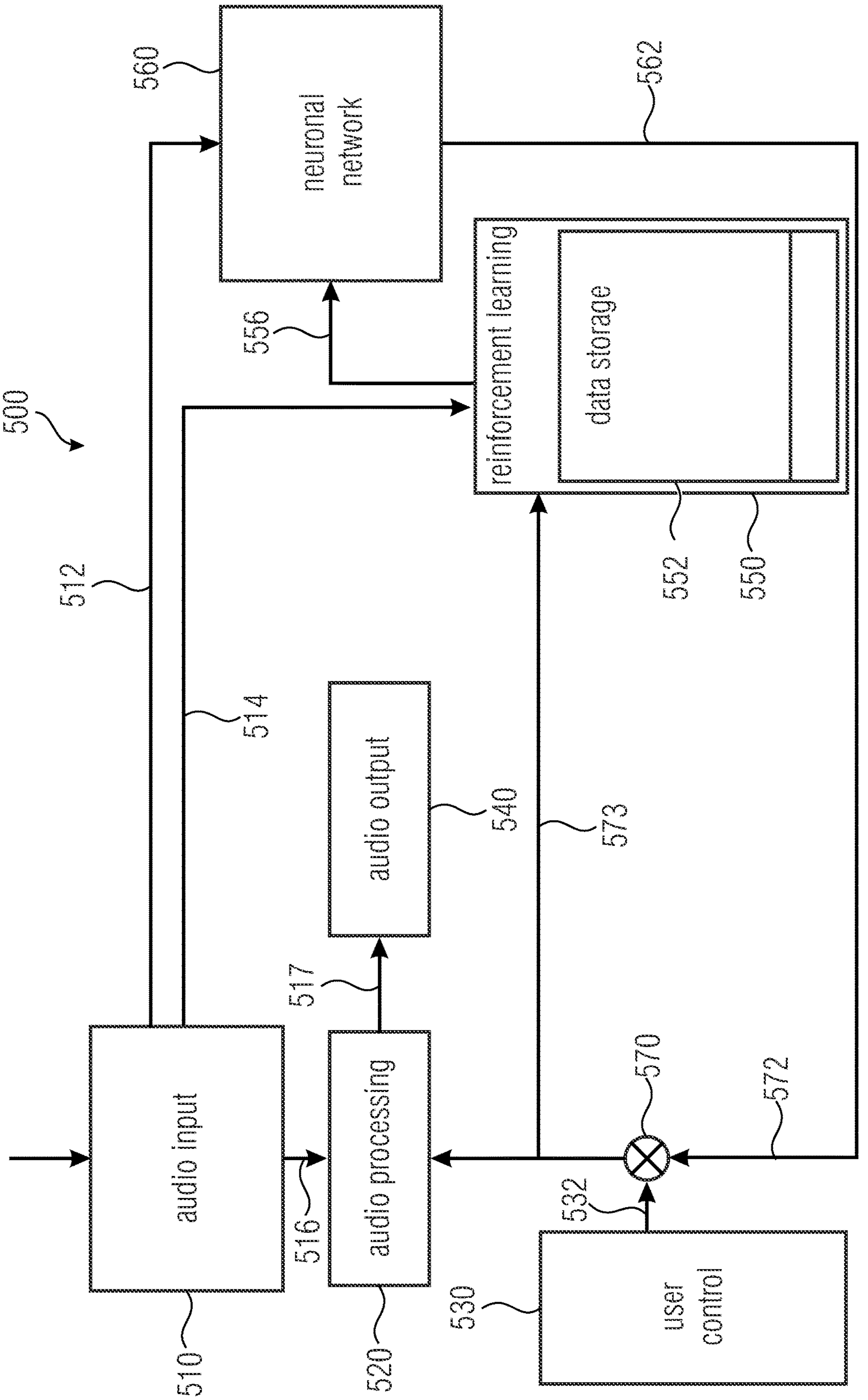
FIG. 5 is a schematic block diagram of an apparatus according to an embodiment that determines audio processing parameters in dependence on at least one audio input signal and by means of reinforcement learning based on an audio input signal and on user parameters adjusted by the user.

FIG. 5 shows an apparatus 500 having similar characteristics as the apparatuses 200, 300 and 400. It should be noted that in the apparatus 500 according to FIG. 5, functional blocks that are also shown in FIG. 2, FIG. 3 and FIG. 4 can have, for example, a similar or the same functionality as respective functional blocks in the apparatus 200, the apparatus 300, and the apparatus 400 (but do not necessarily have to do so). It should further be noted that the apparatus 500 could optionally be supplement by all features, functionalities and details that are described herein, both individually and in combination.

The schematic block diagram of FIG. 5 shows the apparatus 500 including an audio input 510 (which can correspond, for example, to the audio input 210), an audio processing 520 (which can correspond, for example, to the audio processing 220), a user control 530 (which can correspond, for example, to the user control 230), an audio output 540 (which can correspond, for example, to the audio output 240), a reinforcement learning 550 (which can correspond, for example, to the reinforcement learning 250 in terms of its basic function), a neuronal network 560 (which can correspond, for example, to the neuronal network 260 in terms of its basic function), and a combination 570 (which can correspond, for example, to the combination 270).

The apparatus 500 includes, for example, no audio analysis of the audio input signal and no audio analysis of the audio output signal, such that the audio signals 512 and 514 can be guided directly from the audio input 510 into the reinforcement learning 550 or into the neuronal network 560. Optionally, in the apparatus 500, audio analysis of the audio input signal can also take place.

As already mentioned in FIG. 2 of the apparatus 200, an audio input signal 512 can be provided for the neuronal network 560 and an audio input signal 514 for the reinforcement learning 550. In contrary to the apparatus 400, the reinforcement learning 550 of the apparatus 500 can be based on the audio input signal 514 and the one or several audio processing parameters 572 provided to the audio processing 520 (or actually used by the audio processing 520).

Optionally, the user parameter or the combined parameter 572 can be provided to the neuronal network 560, such that the user parameter 572 and the coefficient(s) provided by the reinforcement learning 550 are incorporated in or provided to the neuronal network 560 as input quantities.

The apparatus 500 allows a particularly efficient adjustment of the coefficients of the neuronal network since the reinforcement learning 550 considers the parameters actually used by the audio signal processing 520 and hence can very precisely determine or optimize the coefficients of the neuronal network.

Figure 6:
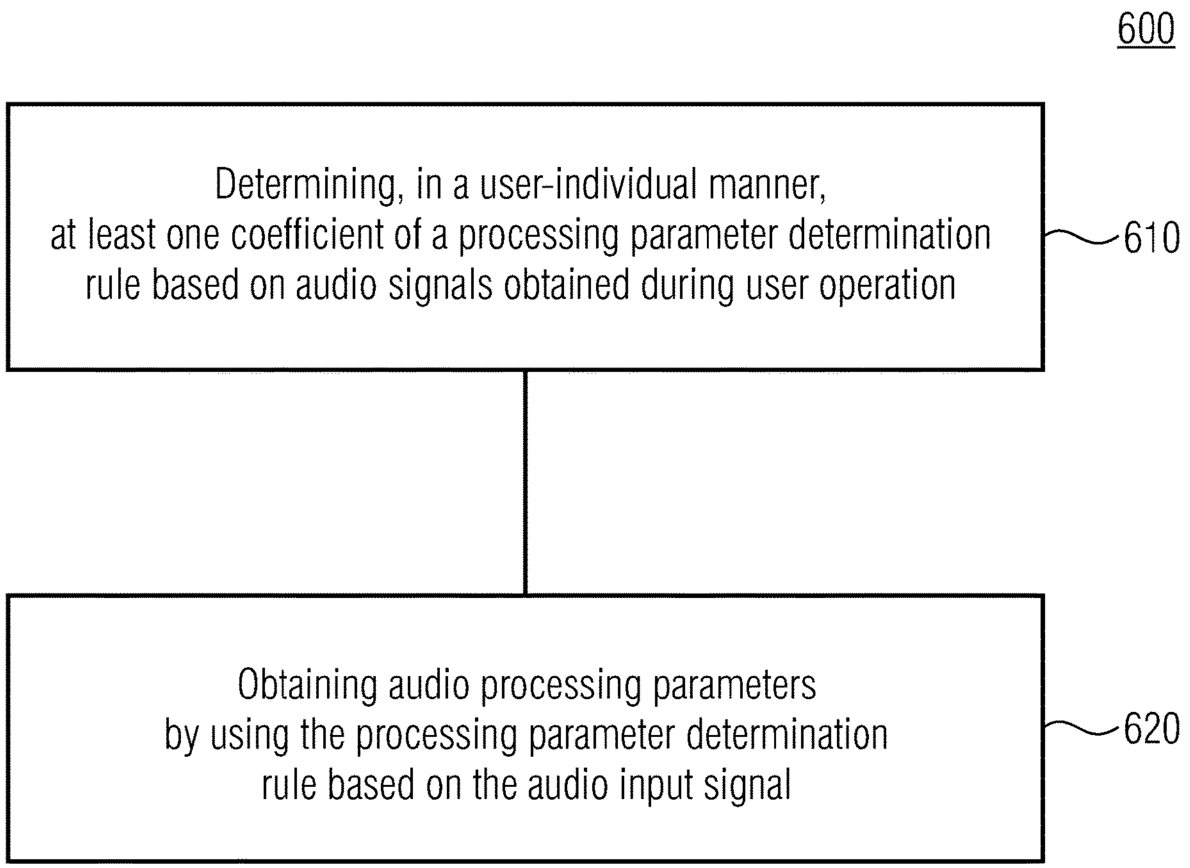
FIG. 6 is a schematic flow diagram of a method according to an embodiment for determining audio processing parameters.

FIG. 6 shows a schematic flow diagram of a method 600 for operating an apparatus, such as the apparatus 100, 200, 300, 400 or 500 or generally for obtaining audio processing parameters. A first step 610 includes user-individually determining at least one coefficient of a processing parameter determination rule based on audio signals obtained during user operation. A second step 620 includes obtaining audio processing parameters by using the processing parameter determination rule based on the audio input signal.

Here, the method 600 is performed, for example, such that audio processing parameters are determined in dependence on at least one audio input signal. Here, the method 600 can be performed such that sound processing or audio processing based on immediately recorded environmental sounds (wherein, for example, an audio input signal results in an adaption of audio processing parameters) results in an improvement of the individual perception of sound. For example, it can be obtained that the coefficients of the processing parameter determination rule are based on audio input signals obtained during user operation and are determined in a user-individual manner (for example in real time), such that audio processing parameters are obtained based on the audio input signal by using a neuronal network, whose coefficients are determined or even continuously adapted by reinforcement learning.

The method 600 can optionally be supplemented by all features, functionalities and details described herein, even when the same have been described with respect to apparatuses. The method can be supplemented by these features, functionalities and details both individually and in combination.

FURTHER EMBODIMENTS

In the following, some aspects of the present invention will be described that can be applied individually or in combination in embodiments.

Situation-dependent control parameters that can be adjusted by the user or user parameters adjusted by the user can be integrated, for example, by analysis of the incoming and outgoing audio signal, such as illustrated in FIG. 3 of the sound processing during training of a self-reinforcing learning algorithm.

The incoming audio signal can include the sound environment. Thereby, changes of the sound environment and the user adjustments can be learned inherently, for example in run time.

From these data, the self-reinforcing learning algorithm can develop, for example, a user-specific parameter set for sound processing that applies, on the one hand, in an automated manner under the same external conditions the same control parameters, but also allows further user adaptations in the situation itself, which are integrated in the learning system (for example, based on a principle of the reinforcement learning). Thus, for example, the machine learning system and the application can be adapted to the sound user preferences in a continuous learning process. For sound adaptation, algorithms can be integrated and controlled as they are used, for example, in hearing aids. Multi-band compression with the rate R and hearing threshold adaption T and band-dependent amplification G, interference noise reduction or blind source separation are examples thereof.

The incoming audio signal, the sound processing parameters and/or the audio signal processed with the sound processing parameters can be stored, for example, for training the user profile in a cloud (e.g. a central data storage). At the same time, the sound processing parameters selected by the user or user parameters can be applied to the incoming audio signal. The number of input parameters for the reinforcement learning, e.g., of a CNN (Convolutional Neural Network) can be combined, for example, of multi-channel audio input (e.g. with C=4 channels) and audio output (e.g. with C=2 channels). The number of output parameters in the learned parameter set M can, for example, be combined of M=C*(T+R+G)+2 time constants, wherein the number of values of G, R, T can correspond, for example, to the number of processing bands B (e.g. B=8).

In the following, some aspects of the present invention will be described, which can be applied individually or in combination in embodiments.

A possible implementation of the method, for example the apparatus in the field of sound control is, for example, that a user carries a sound reproduction device (e.g. a hearable or earphones with additional function) that is provided with a system with integrated sound amplification and audio analysis, for example, as shown in FIG. 3 or FIG. 4. The parameters of the sound amplification can be controlled by the user, for example, with an app (or an application software), for example, by using the above-described user control. In the background, the audio analysis can, for example, continuously record the auditory scene by means of microphonics and analyze and evaluate the same, for example, in dynamics and/or frequency and/or spectral characteristics (for example, in audio analysis). In a specific auditory scene, e.g. when driving in the car on the motorway, the user can perform sound adaptation by means of an app and therefore changes the parameters of the sound amplification (for example, the parameters 272). The system (for example, the reinforcement learning 250) can establish an algorithmic connection between the parameter changes by the user and the analysis of the auditory scene and can develop therefrom a prediction model that integrates further sound adaptations of the user ad hoc by artificial intelligence (AI) (and, for example, describe the same by coefficients 256). This means that a personalized AI control (AI, artificial intelligence) is enabled or provided by the apparatus.

If, for example, the user is again in the same auditory scene at another time, in this case in a car driving on the motorway, the prediction model is applied and the parameters of the sound amplification (for example, the parameters 262) are implemented or provided in an automated manner by the system (e.g. by the neuronal network 260 defined by the coefficients 256). If the user possibly performs sound adaptations again (for example via the interface 230), the same can, for example, be integrated ad hoc into the self-learning system.

In the following, some aspects of the present invention will be described that can be applied individually or in combination in embodiments and that represent, for example, differences with respect to the Github publication "liketohear-ai-pt".

- According to an (optional) aspect of the invention, the prediction model is based on a multi-dimensional optimization in real time analyzing all existing frequency bands.
- According to an (optional) aspect of the invention, for example, methods of reinforcement learning and methods of unsupervised learning are used.
- According to an (optional) aspect of the invention, the adaptation (or the adaptions), for example, of the processing parameter determination rule and/or the audio processing parameters, can take place continuously in run time.

In the following, some aspects of the present invention will be described that can be applied individually or in combination in embodiments that represent, for example, differences to the disclosure US 2015 195641 A1.

Embodiments according to the invention relate, for example, primarily to an intuitive and ergonomic user control of sounds in everyday acoustic environments and use generalized adjustment options for the following reasons:

- A division of the signals into individual "types of sounds" in real time is hard to realize in everyday acoustic situations. Therefore, the present invention does not apply this method, but covers a plurality of sound options with a two-dimensional parameter space.
- User adjustments have to be made separately for each object and each context situation in signal separation. In everyday acoustic environments with quickly changing hearing situations, the user control becomes too complex and therefore not ergonomically applicable. With the present invention, the user can perform complex sound adaptations (for example, in the means 230) with a simple and intuitively usable interface, such as a 2D touch interface of a smartphone.
- Sound characteristics of individual sounds can sound differently in combination than in the preference. For example, sounds like music as foreground or background noise. Thus, in the present invention, for example, the complexity of the auditory scene is adapted to a perception of all existing sounds optimized for the user.
- Adjustments for individual signals are not adapted dynamically to changing environmental conditions. Thus, for example, for softly spoken language or only softly played music, a slight increase of volume of the background noise can make speech unintelligible or music no longer audible.

In the following, some aspects of the present invention will be described that can be applied individually or in combination in embodiments that represent, for example, differences to the disclosure US 2020 0066264 A1.

In the disclosure US 2020 0066264 A1, a processor controls the sound processing of the hearing aid due to user preferences and interests and historical activity patterns.

On the other hand, in embodiments of the present invention, the sound processing of the hearing aid is controlled, for example, based on external conditions measured in real time, for example, as illustrated in FIG. 2.

In summary, it has to be stated that, according to an aspect of the invention, the above-stated criteria or requirements are integrated in a learning method or an apparatus, which learns in real time from user settings and applies the same in an automated manner in order to improve the individual perception of sound or tones in the form of audio signals for the user. By means of the present invention, signal reproduction or audio reproduction optimized to the user preferences can be realized.

Thus, according to an aspect of the present invention, it can be considered that the individual perception of sound and hence the individual requirements for the sound or euphony for their adaptation of sound reproduction devices differ, among others, according to the following criteria:

- Individuality
- Situational needs
- External conditions

According to an aspect of the invention, embodiments according to the invention can consider that the sound perception differs from person to person.

For example, a conversation with a person in a room with many people with a loud sound background is for some people harder to conduct than for others. In addition, depending on the needs, the same adjustment of a sound reproduction is perceived differently.

According to an aspect of the invention, embodiments according to the invention can consider that also environmental parameters, such as the auditory environment, influence the control values for sound adaptation of a sound reproduction device significantly.

In summary, it can further be said that embodiments according to the present invention provide an apparatus and a method that perform sound processing based on environmental noises that are immediately recorded or measured. Based on these recordings and the user parameters adjusted by the user, for example, a learning algorithm generates a prediction model that allows further adaptations in the situation itself, which are integrated in the learning system in order to improve the individual perception of sound or tones in the form of audio signals for the user.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may be stored, for example, on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer. A further embodiment of the inventive method is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may be configured, for example, to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example.

The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for determining audio processing parameters in dependence on at least one audio input signal;

wherein the apparatus is configured to determine at least one coefficient of a processing parameter determination rule in a user-individual manner based on audio signals acquired during user operation;

wherein the apparatus is configured to acquire the audio processing parameters by using the processing parameter determination rule based on the audio input signal;

wherein the apparatus is configured to determine a database in dependence on the at least one audio input signal, such that entries of the database describe the audio input signal;

wherein the apparatus is configured to determine the database in dependence on an audio output signal, which is acquired in dependence on a user parameter, such that entries of the database describe the audio output signal;

wherein the apparatus is configured to adapt the at least one coefficient of the processing parameter determination rule based on the database acquired by the apparatus in order to adapt the processing parameter determination rule in a user-individual manner in order to acquire audio processing parameters that are adapted in a user-individual manner.

2. Apparatus according to claim 1, wherein the apparatus is configured to determine the database in dependence on user parameters adjusted by the user such that entries of the database describe the user parameters adjusted by the user.

3. Apparatus according to claim 1, wherein the apparatus is configured to determine the database, such that the database describes an allocation between different audio input signals and respective user parameters adjusted by the user.

4. Apparatus according to claim 1, wherein the apparatus is configured to determine the database such that the database describes an allocation between different audio output signals and respective user parameters adjusted by the user.

5. Apparatus according to claim 1, wherein the apparatus is configured to provide or adapt the processing parameter determination rule based on the database.

6. Apparatus according to claim 1, wherein the apparatus is configured to determine and/or adapt the at least one coefficient of the processing parameter determination rule based on at least one audio processing parameter corrected and/or amended by a user.

7. Apparatus according to claim 1, wherein the apparatus is configured to perform audio processing based on the audio input signal and based on the audio processing parameter, in order to acquire the audio signals that are adapted in a user-individual manner.

8. Apparatus according to claim 1, wherein the apparatus is configured to determine the coefficients of the processing parameter determination rule by using a comparison of the audio input signal and an audio output signal provided by the audio processing by using the audio processing parameters.

9. Apparatus according to claim 1, wherein the apparatus is configured to provide the user parameters adjusted by the user as output quantity instead of the audio processing parameters, and wherein the user parameters adjusted by the user comprise volume parameters and/or sound parameters and/or equalizer parameters.

10. Apparatus according to claim 1, wherein the apparatus is configured to combine the user parameters with the audio processing parameters to acquire combined parameters of the audio processing and provide the same as output quantity.

11. Apparatus according to claim 1, wherein the apparatus is configured to perform audio analysis of the audio input signal to provide an audio input signal analysis result for determining the at least one coefficient of a processing parameter determination rule.

12. Apparatus according to claim 1, wherein the apparatus is configured to perform audio analysis of the audio output signal to provide an audio output signal analysis result for determining the at least one coefficient of the processing parameter determination rule.

13. Apparatus according to claim 1, wherein the audio processing parameters comprise at least one multiband compression parameter R and/or at least one hearing threshold adaptation parameter T and/or at least one band-dependent amplification parameter G and/or at least one disturbing noise reduction parameter and/or at least one blind source separation parameter and/or at least one sound direction parameter and/or at least one binaural parameter and/or at least one parameter of adaptive filters.

14. Apparatus according to claim 1, wherein the apparatus comprises a neuronal network that is configured to acquire the audio processing parameters by using the processing parameter determination rule.

15. Apparatus according to claim 1, wherein the apparatus is configured to provide and/or adapt the processing parameter determination rule based on a method of reinforcement learning and/or based on a method of unsupervised learning and/or based on a method of multivariate prediction and/or based on a multidimensional parameter space determined with multivariable regression in order to determine the audio processing parameter.

16. Apparatus according to claim 1, wherein the apparatus is configured to acquire the user parameters adjusted by the user from an interface.

17. Apparatus according to claim 1, wherein the audio input signal comprises a multichannel audio signal or at least two audio channels.

18. Apparatus according to claim 1, wherein the apparatus is configured to perform audio processing separately for at least four frequency bands of the audio input signal.

19. Apparatus according to claim 1, wherein the apparatus is configured to determine the at least one coefficient of the processing parameter determination rule in a user-individual manner during user operation in order to acquire the audio processing parameters in real time and/or to determine and/or adapt the amended audio processing parameters in real time.

20. Hearing aid, wherein the hearing aid comprises audio processing; and wherein the hearing aid comprises an apparatus for determining audio processing parameters according to claim 1, wherein the audio processing is configured to process an audio input signal in dependence on the audio processing parameters.

21. Method for determining audio processing parameters in dependence on at least one audio input signal, the method comprising:

determining, in a user-individual manner, at least one coefficient of a processing parameter determination rule based on audio signals acquired during user operation; and acquiring audio processing parameters by using the processing parameter determination rule based on the audio input signal;

wherein a database is determined in dependence on the at least one audio input signal, such that entries of the database describe the audio input signal;

wherein the database is determined in dependence on an audio output signal, which is acquired in dependence on a user parameter, such that entries of the database describe the audio output signal;

wherein the at least one coefficient of the processing parameter determination rule is adapted based on the database acquired by the apparatus in order to adapt the processing parameter determination rule in a user-individual manner in order to acquire audio processing parameters that are adapted in a user-individual manner.

22. A non-transitory digital storage medium having a computer program stored thereon to perform the method for determining audio processing parameters in dependence on at least one audio input signal, the method comprising:

determining, in a user-individual manner, at least one coefficient of a processing parameter determination rule based on audio signals acquired during user operation; and acquiring audio processing parameters by using the processing parameter determination rule based on the audio input signal;

wherein a database is determined in dependence on the at least one audio input signal, such that entries of the database describe the audio input signal;

wherein the database is determined in dependence on an audio output signal, which is acquired in dependence on a user parameter, such that entries of the database describe the audio output signal;

wherein the at least one coefficient of the processing parameter determination rule is adapted based on the database acquired by the apparatus in order to adapt the processing parameter determination rule in a user-individual manner in order to acquire audio processing parameters that are adapted in a user-individual manner, when said computer program is run by a computer.

* * * * *